Patented May 30, 1944

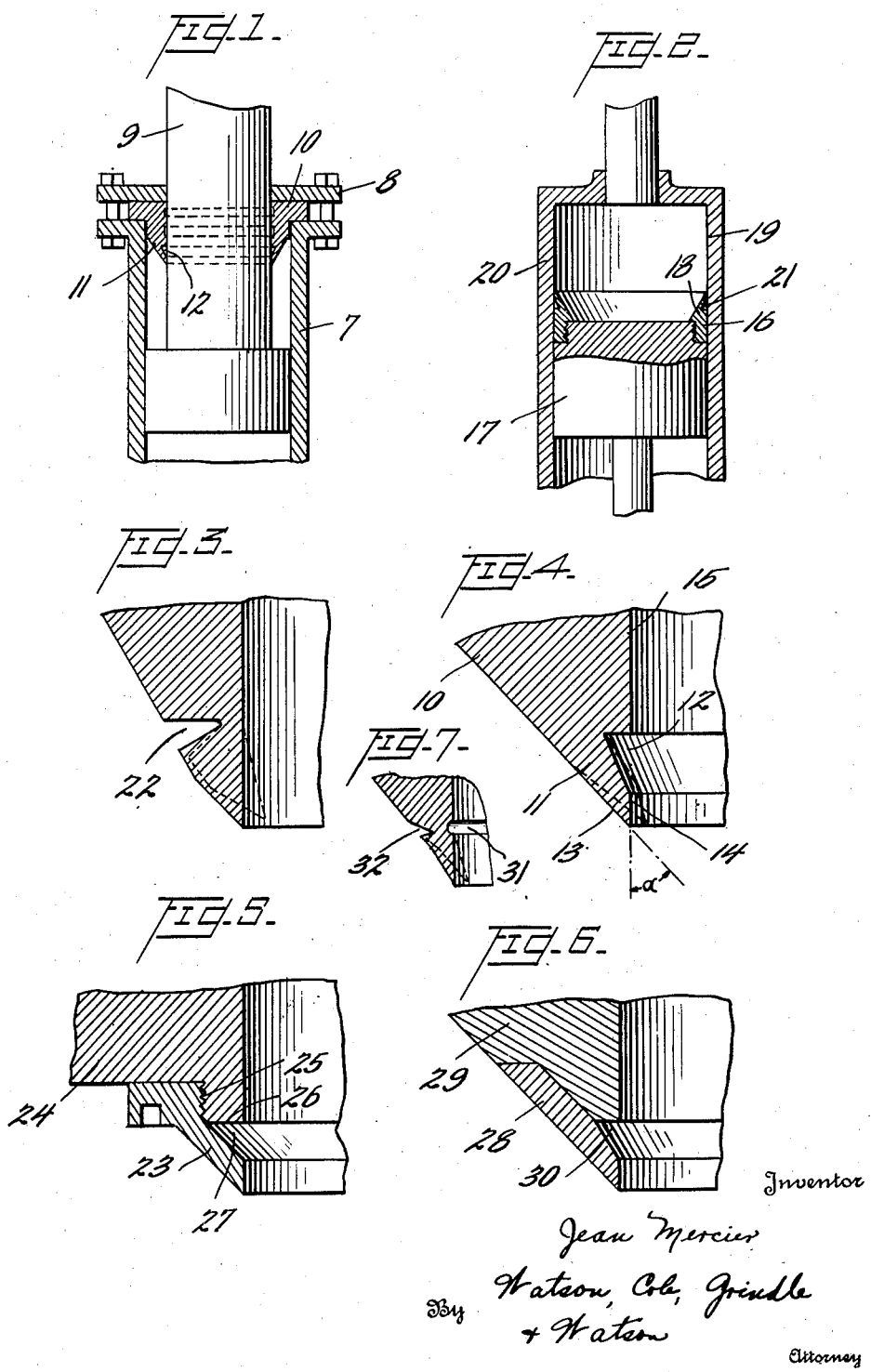

2,350,123

UNITED STATES PATENT OFFICE 2,350,123

METALLIC GLAND

Jean Mercier, New York, N. Y.

Application December 17, 1941, Serial No. 423,391

4 Claims. (Cl. 309—33)

The present invention relates to metallic glands or packing rings adapted for service under conditions of pressure varying from small negative to exceptionally high positive values of pressure and, more particularly, relates to an improvement upon the packing ring described and claimed in my United States Patent No. 2,157,299, granted May 9, 1939.

Packing rings of the type in question comprise, generally, an annular base member and an annular lip portion carried thereby and adapted to fit against the concave internal surface of a cylinder or the convex external surface of a cylindrical rod, such as a piston rod, in order to form a tight joint between two adjacent chambers, or between a chamber containing a pressure fluid and the atmosphere. In the past, such devices have been employed, in which the pressure existing within the chamber with which the gland is associated is employed to press the lip portion of the gland or packing ring against the cylindrical surface to be engaged. Such devices have certain disadvantages, which are more fully pointed out in my patent aforesaid, which disadvantages may be overcome by employing a packing ring having a lip portion joined to its associated base portion by an elastic wall, the lip portion being bent, prior to application to the surface to be sealed, in such a way as to have a smaller diameter than that of the surface to be sealed, in the case of a convex surface, or a larger diameter in the case of a concave surface such as a cylinder wall. In this case the packing ring is elastically deformed in applying the same to the engaged surface, and the lip portion is thereafter maintained in tight engagement with said surface by virtue of the stress resulting from such elastic deformation. Such a packing ring is disclosed in the above mentioned patent.

Packing rings such as those described in my said patent are quite satisfactory for use with fluids at fairly high pressures, e. g. in the neighborhood of 10,000 pounds per square inch, but it has been found that when higher pressures are employed, the elastic wall joining the lip portion to the base portion of the packing ring, will be progressively deformed to such an extent as to cause it to engage the adjacent surface which is sealed by the lip portion, and which of course, is movable relative thereto, in such a way and over so considerable an area as to substantially increase the friction between the packing ring and the surface in question, thus giving rise to considerable wear and otherwise impairing the usefulness of the device with which the packing ring is associated. This shortcoming of the patented packing ring becomes more and more apparent as the applied pressure increases and, practically, prevents its use if pressures of over 20,000 pounds per square inch occur.

It is a general object of the present invention to provide an improved metallic packing ring of the scraping type, in which the surface to be sealed is normally engaged only by a sharp edge of the packing ring, having substantially zero surface area, the packing ring being so designed and constructed that the wall portion joining the sealing lip and the base portion, while retaining sufficient freedom of elastic movement to insure good sealing even at small negative values of pressure will, at rising pressure, offer more resistance to being forced against the adjacent cylindrical surface, and will, even under the influence of extreme pressure, not contact said adjacent surface except over so small an area that the resulting friction can be tolerated without detriment to the usefulness of the packing ring. To this end it is a further object of the present invention to provide a packing ring comprising a base portion, having a sliding fit with the surface to be sealed, and a lip portion adapted to make scraping engagement with the surface to be sealed, the lip portion being relatively rigid in itself and being joined to the base portion in a manner providing an annular groove in the inner or outer surface of the packing ring, or in both, along the line of juncture, the lip portion being bent, before use, along the line of said groove and within certain limits, in order that the lip portion will elastically engage the surface to be sealed, the elastic deformation of the structure not exceeding the elastic limit thereof.

It is a further object of the present invention to provide a metallic packing ring as defined above, the said lip portion being formed of a suitable hard, elastic material capable of taking a sharp edge, such as beryllium copper, and being joined to a base portion of different material, such as anti-friction bronze or duralumin, as by threaded engagement, welding or other suitable means.

Other and further objects, features and advantages of the present invention will be apparent to one skilled in the art from the following description taken in connection with the accompanying drawing in which:

Figure 1 is an axial section through a conventional cylinder containing a piston, a packing ring according to the present invention being applied against the cylindrical wall of the piston rod;

Figure 2 is an axial section through a cylinder and piston illustrating the case in which the packing ring of the present invention is carried by the piston and applied against the wall of the cylinder;

Figures 3, 4, 5, 6, and 7 are fragmentary axial sections illustrating different forms of packing rings constructed in accordance with the present invention.

In order to facilitate an understanding of the invention, reference is made to the embodiments thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the packing ring of the present invention comprises a base portion 10 carrying a lip portion 11 joined to the base portion in a manner providing an annular groove 12 therebetween. The base portion may, for example, be clamped between the wall 7 and head 8 of a cylinder, while the lip 11 engages a piston rod 9. The form of packing ring shown in Figure 1 is illustrated on a larger scale in Figure 4, from which it may be seen that the lip portion 11 is integral with the base portion 10. In this case, the entire ring will be formed of a material having suitable anti-friction properties and at the same time having sufficient elasticity for the purpose set forth and being capable of taking a sharp edge to ensure adequate scraping action relative to the engaged surface. Beryllium copper having a tensile strength of not less than 40,000 pounds per square inch has been found to be a satisfactory material.

In order to ensure a good scraping action, the angle $a$ between the respective lip surfaces 13 and 14 at the scraping edge, as seen in Figure 4, should lie between 30° and 60°, and 45° has been found to be a very satisfactory value.

As illustrated in Figure 4, the lip portion of the packing ring is bent inwardly (in the case of application to a convex surface) to a position shown in dotted lines. Prior to bending, the inner surface 14 of the lip portion, adjacent the scraping edge, lies in the same plane as the inner surface 15 of the base portion, while after bending, it will be seen that the surface 14 will be slightly inclined, or in other words, conical. Thus, when the lip portion is flexed to an extent within its elastic limit, in applying the packing ring to the surface to be sealed, the surface 14 will still be slightly conical, i. e., slightly divergent relative to the engaged surface, thus ensuring normally a substantially line contact of minimum area between the lip and the engaged surface.

The base member 10 of the packing ring has an inner diameter (in the case of application to a piston rod or other convex surface) which makes a close sliding fit with the engaged surface. This clearance depends on the diameter of the cylindrical surface to be sealed and may be, for instance, of the order of .001″ in the case of a piston having a diameter of 2″. It will be apparent that the clearance between the base member and the engaged surface must not be sufficient to permit of relative transverse displacements exceeding the elastic limit of the lip portion, as otherwise such transverse displacements might result in permanent deformation of the lip portion, and a loss of sealing action.

Figure 2 illustrates the case in which a packing ring 16 according to the present invention is secured upon the head of a piston 17, having threaded engagement therewith, the lip portion 18 having scraping engagement with the inner wall 19 of the cylinder 20. The manner of application and the features of construction of the packing ring, in this case, are the same as just described. It will be appreciated that in this case the groove 21 of the packing ring is formed in its outer surface instead of its inner surface, as in the case of Figures 1 and 4, since the outer surface, in the case of Figure 2, lies next to the surface to be sealed. However, the groove need not be formed in that surface which lies next to the surface to be sealed, and Figure 3 illustrates a modification in which a groove 22 is formed in that surface of the packing ring which lies away from the surface to be sealed. Figure 7 illustrates a modification in which grooves 31 and 32 are formed in either surface of the packing ring. As shown in the drawing each of the two grooves is smaller than the groove in the cases where only one is provided. The groove (or grooves) must leave the solid portion at the line of juncture between lip and base portion thick enough to avoid rupture at the highest contemplated pressure. In the cases of Figures 3 and 7, the lip portion prior to application of the packing ring, is bent inwardly as indicated in dotted lines.

Figure 5 illustrates a modification in which the lip portion 23 is formed separately from the base portion 24 and is secured thereto by means of threads 25. In this case the base portion 24 is formed to provide an annular transverse shoulder 26, the inner surface of the lip portion being frusto-conical, whereby a groove 27 is provided between the lip portion and the base portion.

Figure 6 illustrates a further modification in which the lip portion 28 is formed separately from the base portion 29 and is secured thereto by welding, a groove 30 being provided at the line of juncture of the respective portions.

In each of the several forms of packing rings described, it will be appreciated that the base portion may, for present purposes, be considered to be absolutely rigid and incapable of being deformed, by the pressure of the fluid within the cylinder, in such a manner as to increase the normal sliding friction between the base portion and the associated movable member. The initial bending of the lip portion, prior to application of the packing ring to the surface to be sealed, takes place in the area adjacent the apex of the groove separating it from the base portion, while the flexure of the lip portion upon application to the surface to be sealed takes place throughout the axial length of the lip portion, i. e., that part extending above the circular groove. Since this lip portion is relatively short and rigid, it is apparent that even very high pressures will not be capable of distorting it in such a manner as to cause a large area of the lip to engage the surface to be sealed, thus reducing friction and enhancing the sealing action.

Having thus described the invention, what is claimed as new and desired to be secured by Letters Patent is:

1. A scraping metal packing ring comprising a rigid annular base member having a close sliding fit with an adjacent cylindrical surface, and an annular lip portion carried thereby and adapted to engage said cylindrical surface, said lip member being relatively short in the axial direction, having a scraping edge at its free end, and being joined to said base portion in a manner providing at least one annular groove therebetween, said lip being bent along the line of said groove to direct said scraping edge toward said surface to such an extent that upon application of the scraping edge to the said surface said lip will be flexed to an extent not exceeding the elastic limit of said lip.

2. A scraping metal packing ring comprising a rigid annular base member having a close sliding fit with an adjacent cylindrical surface, and an annular lip portion carried thereby and adapted to engage said cylindrical surface, said lip member being relatively short in the axial direction, having a scraping edge at its free end, and being joined to said base portion in a manner providing at least one annular groove therebetween, said groove opening toward said cylindrical surface, said lip being bent along the line of said groove to direct said scraping edge toward said surface to such an extent that upon application of the scraping edge to the said surface said lip will be flexed to an extent not exceeding the elastic limit of said lip.

3. A scraping metal packing ring comprising a rigid annular base member having a close sliding fit with an adjacent cylindrical surface, and an annular lip portion carried thereby and adapted to engage said cylindrical surface, said lip member being relatively short in the axial direction, having a scraping edge at its free end, and being joined to said base portion in a manner providing at least one annular groove therebetween, said lip being bent along the line of said groove to direct said scraping edge toward said surface to such an extent that upon application of the scraping edge to the said surface said lip will be flexed to an extent not exceeding the elastic limit of said lip, a portion of the surface of said lip adjacent said scraping edge lying in the plane of the corresponding surface of said base prior to bending of said lip whereby said lip surface portion is inclined toward said engaged surface after bending as aforesaid.

4. A scraping metal packing ring comprising a rigid annular base member having a close sliding fit with an adjacent cylindrical surface, and an annular lip portion carried thereby and adapted to engage said cylindrical surface, said base member having a transverse shoulder at the point of juncture with said lip portion, the adjacent surface of the latter being frusto-conical, whereby an annular groove is formed between said member and said portion at their line of junction.

JEAN MERCIER.